(12) United States Patent
Monte et al.

(10) Patent No.: US 9,143,361 B2
(45) Date of Patent: *Sep. 22, 2015

(54) SATELLITE COMMUNICATION SYSTEM EMPLOYING A COMBINATION OF TIME SLOTS AND ORTHOGONAL CODES

(71) Applicant: Globalstar, Inc., Milpitas, CA (US)

(72) Inventors: Paul A. Monte, San Jose, CA (US); Vijaya Gallagher, San Jose, CA (US)

(73) Assignee: Globalstar, Inc., Covington, LA (US)

( * ) Notice: Subject to any disclaimer, the term of this patent is extended or adjusted under 35 U.S.C. 154(b) by 204 days.

This patent is subject to a terminal disclaimer.

(21) Appl. No.: 13/652,115

(22) Filed: Oct. 15, 2012

(65) Prior Publication Data

US 2013/0051360 A1 Feb. 28, 2013

Related U.S. Application Data

(60) Division of application No. 11/446,863, filed on Jun. 5, 2006, now abandoned, which is a continuation-in-part of application No. 11/325,176, filed on Jan. 4, 2006, now Pat. No. 7,630,682.

(51) Int. Cl.
*H04W 40/00* (2009.01)
*H04L 12/66* (2006.01)
*H04B 7/195* (2006.01)
*H04W 88/16* (2009.01)

(52) U.S. Cl.
CPC ............. *H04L 12/66* (2013.01); *H04B 7/195* (2013.01); *H04W 88/16* (2013.01)

(58) Field of Classification Search
USPC ........ 455/422.1, 427, 428; 370/310, 315–326
See application file for complete search history.

(56) References Cited

U.S. PATENT DOCUMENTS

| 6,317,420 B1* | 11/2001 | Schiff ........................... 370/325 |
|---|---|---|
| 6,628,921 B1 | 9/2003 | Vaddiparty et al. |
| 6,788,917 B1 | 9/2004 | Refai et al. |
| 6,917,581 B2 | 7/2005 | Proctor, Jr. et al. |
| 7,305,211 B2* | 12/2007 | Dent ............................ 455/12.1 |
| 7,623,859 B2* | 11/2009 | Karabinis ..................... 455/427 |
| 7,920,503 B2 | 4/2011 | Lim et al. |
| 2002/0168945 A1 | 11/2002 | Hwang et al. |
| 2004/0037238 A1* | 2/2004 | Schiff et al. ................... 370/321 |
| 2004/0114552 A1* | 6/2004 | Lim et al. ...................... 370/324 |

(Continued)

FOREIGN PATENT DOCUMENTS

CA 2590791 A1 12/2007
FR 2901934 A1 12/2007

*Primary Examiner* — Ajit Patel
(74) *Attorney, Agent, or Firm* — Jones Walker LLP

(57) ABSTRACT

A satellite communication system for communicating between a plurality of user terminals is disclosed having at least one satellite which provides multiple beams, a plurality of user terminals that communicate with each other via satellites of said constellation, at least one gateway connected to a public switched telephone network and communicating with at least one user terminal over the satellite communication system wherein each of said user terminals within a given frequency band is distinguished from another of the user terminals employing a combination of time slots and orthogonal codes implemented in a forward and return link. Each of the user terminals is equipped to initiate or receive or terminate packet data messages. Each of said user terminals is handed off from one beam of a satellite to another beam of said satellite. The hand off is predicated on signal strength determined at said plurality of user terminals.

8 Claims, 4 Drawing Sheets

(56) References Cited

U.S. PATENT DOCUMENTS

| | | |
|---|---|---|
| 2005/0159103 A1 | 7/2005 | McNeely |
| 2006/0240767 A1 | 10/2006 | Jacomb-Hood et al. |
| 2007/0091837 A1 | 4/2007 | Li et al. |
| 2007/0243822 A1 | 10/2007 | Monte et al. |
| 2007/0275659 A1 * | 11/2007 | Parkman et al. ............ 455/13.4 |

* cited by examiner

SATELLITE COMMUNICATION SYSTEM EMPLOYING A COMBINATION OF TIME SLOTS AND ORTHOGONAL CODES

I. CROSS-REFERENCE TO RELATED APPLICATIONS

This is a divisional of U.S. patent application Ser. No. 11/446,863, filed Jun. 5, 2006, which is a continuation-in-part of U.S. patent application Ser. No. 11/325,176, filed Jan. 4, 2006, which is incorporated by reference.

II. FIELD OF THE INVENTION

The present invention relates to cellular telephone systems. More specifically, the present invention relates to new and improved systems and methods for communicating information in mobile cellular telephone systems or satellite mobile telephone systems employing spread spectrum communication signals.

III. BACKGROUND OF THE INVENTION

Historically, the telephone, which comes from the Greek word 'tele', meaning from afar, and 'phone', meaning voice or voice sound, is said to have been invented on Mar. 10, 1876 in Boston, Mass. by Alexander Graham Bell. The principle of the telephone was conceived as early as 1874 combining electricity and voice which led to Bell's actual invention of the telephone in 1876.

U.S. Pat. No. 174,465 issued Mar. 3, 1876 for improvements in telegraphy is now considered to be the most valuable patent ever issued.

Telstar, the world's first international communications satellite, years later was placed into orbit on Jul. 10, 1962 in a collaboration between NASA and the Bell System. Today satellites in geosynchronous orbit are used mostly for long distance service.

The basic concept of cellular phones which began in 1947 with crude mobile car phones resulted in the realization that using small cells or range of service area with frequency re-use could increase the traffic capacity of mobile phones substantially. However, at this point in time the technology was nonexistent. The cellular telephone is in fact a type of two-way radio which in 1947 AT&T proposed at the FCC allocated large number of radio spectrum frequencies so that widespread mobile phone service could become feasible and provide AT&T an incentive to research the new technology. The FCC's decision to limit the cellular phone frequencies in 1947 resulted in the possibility of only 23 cellular phone conversations which could occur simultaneously in the same service area. In 1968 this was increased. Thereafter, a cellular phone system was proposed by Bell Laboratories. In 1977 AT&T Bell Labs constructed and operated a prototype cellular phone system. In 1981 Motorola and America Radio Phone started a second U.S. cellular radio phone system test in the Washington/Baltimore area. Suddenly consumer demand quickly outstripped the cellular phone system's 1982 standards so that by 1987 cellular phone subscribers exceeded one million and the airwaves were crowded. To stimulate the growth of new cellular phone technology, the FCC declared in 1987 that cellular phone licenses may employ alternative cellular phone technologies in the 800 megahertz band.

Digital wireless and cellular find their roots back in the 1940s when commercial mobile telephony began. On Jun. 17, 1946 in St. Louis, Mo., AT&T and Southwestern Bell introduced the first American commercial mobile radio telephone service and mobile telephony a channel is a pair of frequencies, one frequency to transmit on and one to receive.

A cell phone is a portable telephone which receives or sends messages through a cell site or transmitting tower. Radio waves are used to transfer signals to and from the cell phone, each cell site having a range of 3-5 miles and overlapping other cell sites. All of the cell sites are connected to one or more cellular switching exchanges which can detect the strength of the signal received from the telephone. As the telephone user moves or roams from one cell area to another, the exchange automatically switches the call to the cell site with the strongest signal. The term 'cell phone' is uncommon outside the United States and Japan. However, almost all mobile phones use cellular technology including GSM, CDMA and the old analog mobile phone systems. Hence, the term 'cell phone' has been regarded by many to designate any mobile telephone system. An exception to mobile phones which employ cellular technology are satellite phones; for example, the Iridium phone system which is very much like a cell phone system except the cell sites are in orbit. Marine radio telephone satellites administered by Inmarsat have a completely different system. The Inmarsat satellite system simply retransmits whatever signals it receives with a mobile station's actually logging into a ground station.

With the advent of the Globalstar® satellite telephone system, a great advance in the art was recognized by virtue of a basic telephonic satellite technology which provided a constellation of 48 satellites in low earth orbit which were much simpler to build and less expensive than those of Iridium employing a radically different technology which employs code division multiple access, or CDMA, technology, converting speech signals into a digital format and then transmitting it from the Globalstar® satellite phone up to satellite systems and down to the ground station. Every call on the Globalstar® system possesses its own unique code which distinguishes it from the other calls sharing the airwaves at the same time, and employing CDMA provides signals which are free of interference, cross-talk or static. CDMA was introduced in 1995 and soon became the fastest growing wireless technology and one that was chosen by Globalstar® for use in its satellite communications network, which service Globalstar® launched in 2000.

The key features of the Globalstar® satellite phone employing CDMA provide unique forward and reverse links, direct sequence spread spectrum, seamless soft handoff, universal frequency re-use, propagation through multiple overlapping beams on multiple satellites for diversity, and variable rate transmission.

The Globalstar® satellite phone service is delivered through 48 low earth orbiting satellites providing both voice and data services. The so-called Globalstar® LEO constellation consists of satellites arranged in a Walker constellation, and each satellite is approximately 700 miles from the earth which allows for the highest quality voice clarity of any satellite phone in the industry. At the heart of the Globalstar® system as initially proposed is Qualcomm's adaptation of code division multiple access technology which provides Globalstar's® digital satellite service, resulting in a technology which provides signal security, superior quality, fewer dropped calls and greater reliability. Calls can be made from any gateway via any satellite of the system to any user terminal, as long as the satellite is co-visible from both gateway and user terminal. This co-visibility is what defines a gateway service area; at least 24 gateways around the globe are used to provide worldwide coverage. Each satellite serves at least 2,000 simultaneous users.

The Globalstar® system employs redundancy with every call that a customer places so that a call is routed through as many as four satellites which then combine the signal into a single static-free call. In the event that one of the paths to one of the satellites is blocked, the other satellites keep the call from terminating, applying the technology of path diversity which minimizes dropped calls and enhances the quality of the Globalstar® satellite phone service. The Globalstar® system employs bent pipe technology which allows a call to be first beamed up to the satellite and then retransmitted to a relatively close gateway. The call is then sent through its call destination through land line or cellular networks. The Globalstar® gateway carries out all the processing and switching of the calls which improves the reliability of the call delivery, unlike the Iridium system which requires satellite-to-satellite transmission.

In addition, the Globalstar® system, which provides reliable call delivery with voice characteristics the same or better than conventional telephony, complements the current cellular telephone systems in existence by allowing the user to first use conventional cellular, which is far less expensive but totally dependent upon the proximity of cell sites for its reliability, and then allows the user to select the Globalstar® satellite system where cell sites are far too distant to be reliable or in remote locations where these sites are non-existent. Code division multiple access, which refers to a multiple access scheme where stations use spread spectrum modulations and orthogonal codes to avoid interfering with one another, is typically employed in Globalstar® systems. The CDMA modulation technique is one of several techniques for facilitating communications in which a large number of system users are present. Other multiple access communications system techniques such as time division multiple access (TDMA), frequency division multiple access (FDMA), and AM modulation schemes such as amplitude expanded single sideband (ACSSB) are known in the art. The spread spectrum modulation technique of CDMA is found to have significant advantages over these modulation techniques for multiple access communications systems. CDMA techniques in multiple access communications systems are disclosed in U.S. Pat. No. 4,901,307 entitled Spread Spectrum Multiple Access Communication System Using Satellite or Terrestrial Repeaters, the disclosure thereof is incorporated by reference.

In this patent, a multiple access technique is disclosed where a large number of mobile telephone system users each having a transceiver communicate through satellite repeaters or terrestrial base stations, also referred to as cell sites stations, cell sites, or for short cells, using code division multiple access (CDMA) spread spectrum communication signals. Frequency spectrum employed in CDMA can be reused multiple times, thus permitting an increase in system user capacity. The CDMA is found to result in a much higher spectral efficiency than can be achieved using other multiple access techniques.

Satellite channels employing this system typically experience fading that is characterized as Rician. Accordingly, this signal is found to consist of a direct component summed with a multiple reflected component having a Rayleigh fading statistic. A power ratio between the direct and reflected component is typically found to be on the order of 6 to 10 dBs depending upon the characteristics of the mobile unit antenna and the environment about the mobile unit. Contrasted to the satellite channel, the terrestrial channel experiences signal fading that typically consists of the Rayleigh faded component without a direct component. This terrestrial channel is found to present a more severe fading environment than the satellite channel in which the Rician fading is the dominant fading characteristic.

The Rayleigh fading characteristics experienced in the terrestrial signal is found to be caused by the signal being reflected from many different features of the physical environment, resulting in a signal which arrives at a mobile unit receiver from many directions with different transmission delays. In the UHF frequency bands which are usually employed for mobile radio communications, including cellular mobile telephone systems, there is found to be significant phase differences in signals traveling on different paths which provides the possibility of destructive summation of the signals causing occasional deep fades. Physical position of the mobile unit is a strong function of the terrestrial channel fading so that small changes in the position of the mobile unit change the physical delays of all the signal propagation paths which further result in a different phase for each path. The motion of the mobile unit through the environment can result in a rapid fading process; for example, employing 850 MHz cellular radio frequency band, the fading can typically be as fast as one fade per second per mile per hour of the vehicle speed. This level of fading is found to be extremely disruptive to signals in a terrestrial channel, resulting in poor communication quality. Quality may be improved by providing additional power to overcome the fading, which in itself affects both the user in excessive power consumption and the system by increased interference. Certain CDMA modulation techniques disclosed in U.S. Pat. No. 4,901,307 offer some advantages over narrow band modulation techniques using communication systems employing satellite or terrestrial repeaters. The terrestrial channel is found to pose special problems to any communication system, particularly with respect to multiple path. These problems may be overcome by using CDMA techniques which overcome the special problems of the terrestrial channel by mitigating the adverse effect of multipath, for example fading, while also exploiting the advantages of multipath.

CDMA cellular telephone systems allow the same frequency band to be employed for communication in all calls. CDMA waveform properties that provide processing gain are also used to discriminate between signals that occupy the same frequency band. Furthermore, the high speed pseudo-noise PN modulation allows many different propagation paths to be separated provided the difference in path delay exceed the PN chip duration; i.e., 1/bandwidth. It is found that if a PN chip rate of approximately one MHz is employed in a CDM system, the full spread spectrum processing gain equal to the ratio of the spread bandwidth to system data rate can be employed against paths that differ by more than one microsecond in path delay from desired path. It is found that a one microsecond path delay differential corresponds to differential path distance of approximately 1,000 feet, the urban environment typically providing differential path delays in excess of one microsecond and up to 10-20 microseconds in some areas. When narrow band modulation systems are employed, such as at analog FM modulation, by conventional telephone systems, the existence of multiple paths results in severe multipath fading. By employing wideband CDMA modulation, the different paths may be discriminated against in the demodulation process which greatly reduces the severity of multipath fading. Although multipath fading is not totally eliminated using CDMA discrimination techniques, there will occasionally exist paths with delayed differentials of less than the PN chip duration for the particular system. For signals which possess path delays on this order, it is found that signals cannot be discriminated against in the demodulator, resulting in some degree of fading.

It becomes apparent that some form of diversity is desirable which would permit a system to reduce fading. One such system is diversity which mitigates the deleterious effects of fading. The three major types of diversity which may be employed are time diversity, frequency diversity and space diversity. Time diversity is found to be best obtained by the use of repetition, time interleaving and error detection and coding which is a form of repetition.

CDMA by its inherent nature possessing a wide band signal which offers a form of frequency diversity by spreading the signal energy over a wide bandwidth, resulting in a small part of the CDMA signal bandwidth experiencing selective fading effects.

Space or path diversity is obtained by providing multiple signal paths through simultaneously links from a mobile user through two or more cell sites. Path diversity may be obtained by exploiting the multipath environment through spread spectrum processing by allowing a signal arriving with different propagation delays to be received and processed separately. In U.S. Pat. No. 5,101,501 entitled Soft Handoff in a CDMA Cellular Telephone System, and U.S. Pat. No. 5,109,390 entitled Diversity Receiver in a CDMA Cellular Telephone System, examples of path diversity are illustrated. Further control of deleterious effects in a CDMA system may be realized by controlling transmitter power. Such a system for cell site mobile unit power control is disclosed in U.S. Pat. No. 5,056,109 entitled Method and Apparatus for Controlling Transmission Power in a CDMA Cellular Mobile Telephone System. Techniques as disclosed in U.S. Pat. No. 4,901,307 contemplate the use of coherent modulation and demodulation for both directions of the link in mobile satellite communications. A pilot carrier signal as a coherent phase reference for the satellite to mobile link and the cell to mobile link is disclosed. It is found, however, that the severity of multipath fading experienced in the terrestrial cellular environment with the resulting phase disruption of the channel precludes usage of coherent demodulation techniques for the mobile to cell link.

Relatively long PN sequences with each user channel being assigned a different PN sequence are also disclosed in U.S. Pat. No. 4,901,307. The different user signals may be discriminated upon reception employing the cross correlation between different PN sequences and the auto correlation of a PN sequence for all time shifts other than zero where both have a zero average value. Although the cross correlations average zero for a short time interval, such as an information bit time, the cross correlation follows a binomial distribution since PN signals are not orthogonal. As such, signals interfere with each other much the same as if they were wide bandwidth Gaussian noise resulting in other user signals or mutual interference noise ultimately limiting the achievable capacity.

Multipath can provide path diversity to a wide band PN CDMA system which uses greater than 1 MHz bandwidth if two or more paths are available with greater than one microsecond differential path delay. Two or more PN receivers can be employed to separately receive these signals. These signals typically will exhibit independence in multipath fading, i.e., they usually do not fade together, the outputs of the two receivers can be diversity combined. It is found that a loss in performance in this situation only occurs when both receivers experience fades at the same time, hence two or more PN receivers in combination with a diversity combiner may be employed utilizing a waveform that permits path diversity combining operations to be performed.

In U.S. Pat. No. 4,901,307 filed Oct. 17, 1986, issued Feb. 13, 1990, a communication system which accommodates a large number of users throughout a variety of user environments from high density urban to very low density rural is provided which results in a multiple access communication system having high simultaneous user capacity.

In U.S. Pat. No. 5,101,501 filed Nov. 7, 1989, issued Mar. 31, 1992, there is disclosed a CDMA cellular telephone system wherein the same frequency band is used for all cells employing CDMA waveform properties that provide processing gains which are also used to discriminate between signals that occupy the same frequency band.

In U.S. Pat. No. 5,103,459 filed Jun. 25, 1990, issued Apr. 7, 1992, there is disclosed spread spectrum communication techniques, particularly CDMA techniques, in the mobile cellular telephone environment which provide features to vastly enhance system reliability and capacity over other communication system techniques overcoming fading and interference while providing greater frequency reuse and enabling a substantial increase in the number of system users.

In U.S. Pat. No. 5,109,390 filed Nov. 7, 1989, issued Apr. 28, 1992, there is disclosed a CDMA cellular telephone system where the same frequency band is used for communication in all cells to provide a cellular telephone system in which a receiver design facilitates reception and processing of the strongest signals transmitted from one or more cell sites, the signals being multipath signals from a single cell site or signals transmitted by multiple cell sites.

In U.S. Pat. No. 5,233,626 filed May 11, 1992, issued Aug. 3, 1993, there is disclosed a repeater diversity spread spectrum communication system providing substantially fade free communications between a transmitter (1) and a receiver (7). A transmitted signal is relayed through a plurality of linear communications repeaters (3-6) that produce copies of the transmitted signal, the copies each arriving through an independently fading signal path. The receiver processes the received signal copies to equalize them to one another in delay, frequency, and phase, and then combines the multiple received and equalized signal copies to produce a composite signal having a greatly reduced fading depth.

In U.S. Pat. No. 5,267,261 filed Mar. 5, 1992, issued Nov. 30, 1993, there is provided a system for directing handoff in mobile station communication between base stations which employ code division multiple access techniques.

In U.S. Pat. No. 5,267,262 filed Oct. 8, 1991, issued Nov. 30, 1993, there is disclosed a CDMA cellular mobile telephone wherein the transmitter power of the mobile units are controlled so as to produce at the cell site a nominal received signal power from each and every mobile unit transmitter operating within the cell. Thus, the transmitter power is controlled in the terrestrial channel and the cell diversity environment so as to overcome deleterious fading without causing unnecessary system interference.

In U.S. Pat. No. 5,303,286 filed Mar. 29, 1991, issued Apr. 12, 1994, there is disclosed a radio communication system capable of servicing a roaming user or the like outside the range of terrestrial relay stations including a packet switched network and database of roaming users, a satellite communications system having at least one, but usually a plurality of orbiting satellites over a terrestrial satellite service area, a satellite control center and a plurality of terrestrial communication links wherein call setup is controlled by processors and databases onboard the orbiting satellites and wherein only after the satellite link for the communication channels is completed, does control and switching rely on ground base system such that the orbiting satellites are integrated into a ground based telephone network and tariff structure.

In U.S. Pat. No. 5,309,474 filed Mar. 27, 1992, issued May 3, 1994, there is disclosed spread spectrum communication techniques, particularly CDMA, in a mobile cellular telephone environment which provides features to vastly enhance system reliability and capacity over other communication system techniques.

In U.S. Pat. No. 5,416,797 filed Jan. 24, 1992, issued May 16, 1995, there is disclosed a system for constructing PN sequences that provide orthogonality between the users so that mutual interference will be reduced allowing higher capacity and better link performance, employing spread spectrum communication techniques, particularly CDMA, in a mobile cellular telephone environment.

In U.S. Pat. No. 5,715,297 filed Sep. 15, 1995, issued Feb. 3, 1998, there is disclosed a radio communication system capable of servicing a roaming user or the like outside the range of terrestrial relay stations which includes a packet switched network and database of roaming users, a satellite communications system having at least one, but usually a plurality of orbiting satellites over a terrestrial satellite service area, a satellite control center and a plurality of terrestrial communication links, wherein call setup is controlled by processors and databases onboard the orbiting satellites and wherein only after the satellite link for the communication channels is completed, does control and switching rely on ground based equipment such that the orbiting satellites are integrated to a ground based telephone network and tariff structure.

In U.S. Pat. No. 5,903,837 filed Sep. 22, 1997, issued May 11, 1999, there is disclosed a radio communication system capable of servicing a roaming user or the like outside the range of terrestrial relay stations which includes a packet switched network and database of roaming users, a satellite communications system having at least one, but usually a plurality of orbiting satellites over a terrestrial satellite service area, a satellite control center and a plurality of terrestrial communication links wherein call setup is controlled by processors and databases onboard the orbiting satellites and wherein only after the satellite link for the communication channel is completed, does control and switching rely on ground based equipment such that the orbiting satellites are integrated into a ground based telephone network and tariff structure.

In U.S. Pat. No. 6,032,041 filed Jun. 2, 1997, issued Feb. 29, 2000, there is disclosed a satellite based communication system operating at high data rates including a plurality of satellites each having uplink and downlink antennas for transmitting and receiving a plurality of signals utilizing a plurality of spot beams to and from a plurality of coverage areas at a predetermined range of frequencies. The system also includes a plurality of user terminals for transmitting and receiving signals to and from the plurality of communication satellites at the predetermined range of frequencies and at one of the first plurality of data rates. Each of the user terminals have a steerable antenna for tracking relative motion of each of the user terminals with respect to each of the plurality of communication satellites and for tracking movement of each of the plurality of communication satellites in order to maintain communications with the plurality of communication satellites.

In U.S. Pat. No. 6,041,233 filed Sep. 12, 1997, issued Mar. 21, 2000, there is disclosed a method and system for providing global variable data rate connectivity in a satellite based communications network which includes a plurality of communications satellites for transmitting and receiving signals in a plurality of coverage areas. User terminals transmit and receive signals to and from the satellites. A set of the user terminals located in one of the coverage areas and associated with one of the communications satellites has a variable bandwidth associated therewith. The variable bandwidth is determined based on the collective bandwidth requirements of each of the user terminals in the set. Each of the user terminals may request a change in their bandwidth requirement independent of the variable bandwidth associated with the collective set of the user terminals.

In U.S. Pat. No. 6,072,768 filed Sep. 4, 1996, issued Jun. 6, 2000, there is disclosed a communication system having a satellite communication component comprising at least one satellite and at least one terrestrial gateway and also a wireless terrestrial communication component comprising at least one repeater and at least one mobile switching center, the gateway and switching center coupled together by a first mobile applications part network, the gateway and the mobile switching center further coupled to a terrestrial communication network, further including at least one dual mode or higher tri-mode user terminal comprising a first transceiver for bidirectionally communicating with the gateway through the satellite, a second transceiver for bidirectionally communicating with the mobile switching center through the repeater and a controller responsive to one of a user selected or a gateway selected protocol for selectively enabling either the first or the second transceiver for conveying a user communication to a terrestrial communication network.

In U.S. Pat. No. 6,339,707 filed Sep. 14, 1999, issued Jan. 15, 2002, there is disclosed a satellite based communication system operating at high data rates including a plurality of satellites each having uplink and downlink antennas for transmitting and receiving a plurality of signals utilizing a plurality of spot beams to and from a plurality of coverage areas at a predetermined range of frequencies. The system also includes a plurality of user terminals for transmitting and receiving signals to and from the plurality of communications satellites at the predetermined range of frequencies and at one of the first plurality of data rates. Each of the user terminals having a steerable antenna for tracking relative movement of each of the user terminals with respect to each of the plurality of communications satellites are for tracking movement of each of the plurality of communication satellites in order to maintain communications with the plurality of communications satellites.

In U.S. Pat. No. 6,396,822 filed Jul. 13, 1998, issued May 28, 2002, there is disclosed a method and apparatus for encoding data for transmission in a communication system which provides increased efficiency and bandwidth utilization through higher data rates, lower error rates, lower power levels and/or increased capacity. A set of orthogonal codes is partitioned into subsets. The data to be transmitted is partitioned into packets of bit sequences, each of which is mapped to an orthogonal code in an assigned subset. The number of members in a particular subset is determined by the relative transmission requirements of the data signal the subset will be used to encode.

In U.S. Pat. No. 6,510,147 filed Jul. 13, 1998, issued Jan. 21, 2003, there is disclosed a system and method for transmitting wideband signals via a radio communication system adapted for transmitting narrowband signals. A base station is used to transmit and receive a plurality of relatively narrowband and a plurality of relatively wideband signals. The electromagnetic spectrum available to the plurality of narrowband signals is selectively shared with the electromagnetic spectrum available to the wideband signals by systematically separating the orthogonal codes and the carrier frequencies used for transmission. The frequencies of the orthogonal codes are preferably mutually exclusive and the carrier frequencies are preferably separated by an offset. The offset may be substantially equal to an energy or multiple of the narrowband signals chip rate. Alternatively, the offset may be substantially equal to an odd multiple of one-half the narrowband signals chip rate in which case every other bit of the orthogonally encoded data is inverted.

In U.S. Pat. No. 6,515,617 filed Nov. 25, 1998, issued Feb. 4, 2003, there is disclosed a system 20 and a method 30 for estimating the location of a terrestrial based user terminal 23. The user terminal 23 is capable of measuring the relative signal strengths of a plurality of spot beams pilot signal emitted from a geostationary satellite 22. The user terminal 23 then estimates its position based on the measured relative signal strengths. Using this approach, the user terminal 23 can quickly determine its location without prior knowledge of its position or delay time.

In U.S. Pat. No. 6,640,236 filed Aug. 31, 1999, issued Oct. 28, 2003, there disclosed an apparatus for generating a PN sequence with an arbitrary number of bits where the number of bits is provided in parallel with each clock pulse, allowing the sequences to be generated at high speed when needed and allowing parallel processing in the acquisition and demodulation processes.

In U.S. Pat. No. 6,693,951 filed Jul. 23, 1999, issued Feb. 17, 2004, there is disclosed implementation of spread spectrum communication techniques, particularly CDMA, in a mobile cellular telephone environment which provides features that vastly enhance system reliability and capacity over other communication system techniques, overcoming, for example, fading and interference while promoting greater frequency reuse, enabling a substantial increase in the number of system users.

In U.S. Pat. No. 6,697,345 filed Jul. 23, 1999, issued Feb. 24, 2004, there is disclosed a radio and related methods of radio communication consisting of one or more signal formatters wherein the one or more signal formatters format signals for transmission to the radio and the signals comprise a plurality of transport mode signals. The radio also includes a modem coupled to one or more signal formatters for modulating the signals, a frequency converter coupled to the modem for up-converting the signals having been modulated to a radio frequency and a transceiver unit coupled to the frequency converter for transmitting the signals having been up-converted over a radio communications link.

In U.S. Pat. No. 6,714,780 filed Jun. 12, 2001, issued Mar. 30, 2004, there is disclosed a multibeam communication system having a user terminal, a communications station for transmitting information to and receiving information from the user terminal and a plurality of beam sources where each beam source projects a plurality of beams and where a communication link between the user terminal and the communications station is established on one or more beams, providing a system and method for reducing call dropping rates while maintaining a desired level of beam source diversity.

In U.S. Pat. No. 6,839,007 filed Sep. 9, 2002, issued Jan. 4, 2005, there is disclosed embodiments which address the need for reliable transmission of higher priority data within a frame wherein an inner code is applied to one or more partial segments of a transmitted data frame, in addition to an outer code applied to the entire frame, the inner code segment being retained when the inner decoding decodes without error providing the benefit of reducing the number of retransmissions of higher priority data, as well as reducing delay for time sensitive segments of the frame.

Various satellite telephone systems have been proposed, including those as depicted in the FCC filing for "Authority to Launch and Operate a Satellite System to Provide Mobile Satellite Services in the 2 GHz Bands" dated Nov. 3, 2000, relating to the Globalstar® system, which is hereby incorporated by reference; the FCC filing in the matter of Mobile Satellite Ventures Subsidiary, LLC for "Minor Amendment of Application to Launch and Operate a Replacement L Band Mobile Service Satellite at 101.degree. West" dated Nov. 18, 2003; and the FCC filing by Thoraya which depicts a one GEO satellite system to provide a satellite telephone service.

Thus, it can be seen from the inception of the telephone through its various phases of improvement, cellular to satellite cellular telephony, a vast number of advances have been made which provide a modern, efficient and affordable telephone system which today, in many cases, supplants the existing telephone system and may in the future do so on an increasing basis.

There is, however, a continuing demonstrated need to provide improved satellite constellation systems, preferably LEO systems, which provide multiple beams to a plurality of users and employ at least one gateway connected to a PSTN communicating with a user over the constellation where each of the users within a given frequency band is distinguished from another employing orthogonal codes.

Although previous patents such as U.S. Pat. No. 4,901,307 describe or reference a multi-beam satellite system, these beams are considered to cover fixed regions on the ground, which requires a GEO satellite. In this case, the same sort of hand-off of a user terminal from beam to beam can be used as is used in a terrestrial cellular system. However, the '307 patent does not address the case where the beams and satellites are rapidly moving as they are in a MEO or LEO system, since it was written in an era that preceded the satellite technology that enabled large numbers of relatively smaller satellites (such as Globalstar's®) to be economically and reliably launched and controlled. Therefore, the hand-off issues described in the '307 patent are much simpler than those encountered in the Globalstar® system or similar LEO or MEO systems, or even those encountered in GEO systems which have dynamically varying beam shapes, which is another technological advance that is now feasible in satellite systems. That patent also does not address packet data services, since those were not widely used in the time frame of the patent. Other patents that address packet data services also do not address the LEO, MEO or dynamic beam GEO systems. The present invention describes a multi-beam LEO, MEO or GEO satellite system that can be used to provide packet data services (in addition to voice) for mobile users, that can be either initiating or receiving packet data calls over the system, while communicating with either a fixed or mobile user anywhere in the world.

IV. OBJECTS OF THE INVENTION

There is, however, a continued demonstrated need to provide an improved satellite communication system, preferably a LEO constellation system, which provides multiple beams to a plurality of users and employs at least one gateway connected to a PSTN communicating with a user over the satellite communication system, wherein each of said UTs within a given frequency band is distinguished from another employing orthogonal codes.

It is therefore an object of this invention to provide a satellite constellation system employing multiple beams to a plurality of users where each of the users within a given frequency band is distinguished from another employing a combination of time slots and orthogonal codes.

A further object of this invention is to provide a LEO satellite constellation system which provides multiple beams to a plurality of users employing at least one gateway connected to a PSTN wherein the users within a given frequency band are distinguished one from the other employing a combination of time slots and orthogonal codes.

Still another object of this invention is to provide an improved satellite constellation system which provides multiple beams to a plurality of users employing at least one gateway connected to the Internet wherein each of said users within an given frequency band is distinguished from another user employing a combination of time slots and orthogonal codes.

Again another object of this invention is to provide a GEO satellite constellation system providing multiple beams to a plurality of users employing at least one gateway and either connected to a PSTN or the Internet wherein a user within a given frequency band is distinguished from another user employing a combination of time slots and orthogonal codes.

Yet again another object of this invention is to provide an improved MEO satellite constellation system which provides multiple beams to a plurality of users employing at least one gateway connected to either a PSTN or the Internet wherein one user within a given frequency band is distinguished from another user employing a combination of time slots and orthogonal codes.

Yet again another object of this invention is to provide a satellite constellation system providing multiple beams to a plurality of users employing at least one gateway connected to either a PSTN or the Internet wherein one user within a given frequency band is distinguished from another user employing a combination of time slots and orthogonal codes.

V. BRIEF SUMMARY OF THE INVENTION

These and other objects of the instant invention are accomplished, generally speaking, by providing an improved system employing at least one satellite wherein each satellite provides multiple beams to a plurality of user terminals wherein at least one gateway is employed to connect to either a PSTN or the Internet, communicating with a user terminal over the satellite communication system so that the users within a given frequency range are distinguished one from the other employing a combination of time slots and orthogonal codes, i.e., a hybrid TDM/CDMA system.

Thus, for example, in a preferred embodiment a LEO satellite constellation comprising approximately 40 to 48 satellites as presently employed in the Globalstar® system is provided, employing multiple beams which may reach a plurality of user terminals. A gateway is employed connected to either a PSTN or the Internet and communicating with a user terminal over the constellation so that users within a given frequency range are distinguished one from the other employing a combination of time slots and orthogonal codes.

In a conventional embodiment of this system, the forward link from gateway through the satellite to the UT is similar to the terrestrial WCDMA forward link signal or wideband CDMA (code division multiple access) signal, except that the chip rate and the channel bandwidth are system specific. Each system is divided to frames with each frame divided into time slots. Each UT is distinguished based on a combination of time slots and orthogonal codes. Multiple codes from a single code tree, such as a set of orthogonal variable spread factor (OVSF) codes can be combined to offer different data rates as in terrestrial WCDMA. Long pseudo-random noise codes, or PN codes, are additionally used to distinguish each beam from each satellite as in the current Globalstar® system.

The power allocated to each UT based on UT type and/or UT mode of operation in each time slot is predetermined by the gateway and used to vary the data rate to the as its propagation environment changes. A similar technique is also used in HSDPA, or high speed digital packet access, in the terrestrial WCDMA standard. An alternative is to use power control similar to what is used in the current generation of Globalstar® where the UT data rate is kept constant and the power transmitted to the UT is varied according to propagation environment.

A center frequency of the signal transmitted to each UT is adjusted to precompensate for Doppler between the gateway and satellite, thus minimizing the search time and window that the UT needs to lock on to the signal. This technique is currently used in the Globalstar® system. Similarly, the timing of signals in each time slot transmitted to each UT is adjusted by the gateway based on a calculated position of each UT. This calculation may be done initially either by incorporating GPS into each UT, which informs the gateway of its coordinates, or by other known means of position location such as techniques currently used in the Globalstar® system which is based on triangulation using multiple different delays from different satellites and later on adjusting based on a rate of change of the UTs relative position to the serving Globalstar® system. The reverse link as presently employed in such a system is similar to the Globalstar® reverse link non-orthogonal, non-coherent CDMA but, in addition, it also employs time slots as in the forward link described above to allow each user to send as much or as little data as needed. Specifically, the reverse link employs short time slices of signals with different phase shifts of a long PN code to identify different users. In addition, it employs Walsh orthogonal modulation to provide high levels of immunity to noise as in the current Globalstar® system. However, the higher layers of the protocol are designed to be similar to the WCDMA higher layers so that the packet data can be officially transmitted without the need to set up dedicated channels as is done in the current Globalstar® system which employs circuit switching.

Reverse link power control can be performed as in the current Globalstar® system where data rate is fixed and power is varied as needed to meet the link budget or by varying the data rate and keeping UT power fixed as was previously mentioned for the forward link above. A trade off is employed between allowing a greater number of UT data rates to improve granularity of power utilization versus hardware complexity at the gateway.

The gateway receiver compensates for the gateway to satellite Doppler based on accurately known satellite positions and for the less precisely known UT locations.

Any suitable satellite may be employed in the system of the instant invention. Typical satellites include bent pipe repeaters, satellites equipped with low end processing power to those that include high processing systems.

Any suitable gateway may be employed in the system of the instant invention. Typical gateways include the Globalstar® gateway which is more fully described in U.S. Pat. No. 6,804,514, FIG. 2B.

The gateway consists of the following major subsystems:

a) Transceivers and associated RF antennas, which transmit RF signals to the satellite constellation and receive RF signals from the satellite constellation. A typical gateway for a satellite system has two or more antennas each of which is able to track one of the two or more satellites visible to the gateway.

b) A TDM/CDMA subsystem that modulates/demodulates and spreads/despreads the TDM/CDMA signals that are being transmitted/received by the transceivers.

c) A Gateway Controller (GC) that is used to control the operation of all the gateway subsystems.

d) A Baseband Processing Subsystem (BPS) that processes and transmits the baseband signals between the TDM/CDMA subsystem and an IS-41 switch or a GSM switch, both of which connect to the PSTN and enable the mobile satellite users' calls to be routed to and from terrestrial callers on the PSTN.

e) A Call Control Processor (CCP) that generally handles radio setup and channel assignments, along with other call related functions. The CCP may include the gateway Visitor Location Register (VLR) that enables roaming between gateways.

f) Current gateways comprise a Global Mobile System Interface (GSMI) or to a router which connects to the Internet. The router routes data packets to/from the Internet or other packet data network. The GSMI detects the presence of a GSM call and routes it to the GSM switch and enables GSM roaming. Optimal systems would not have a GSMI.

The signal is received at the MSS Gateway and, after downconverting, demodulating in transceivers and TDM/CDMA system, and otherwise being processed, is delivered to a BPS. The signal after processing by the BPS is provided as an output. This output signal may be sent to a Mobile Switching Center (MSC), such as an IS-41 switch or a GSM switch (that contains the GSM VLR), or to a Router, or it may be provided directly to the HS/LS Interface in the High Speed System. Depending on the means chosen, the signal is either routed via an internal or external network to the Operations Center (also referred to herein as the User Control Center). The signal is then processed by the Operations Center and, depending on the nature of the call setup desired, is routed to the external network for interaction with the Media provider, or is used otherwise in the Operations Center. The Operations Center may be collocated with the Gateway, or it may be at a remote location and connected though the external network.

Further components of the MSS Gateway include a Call Control Processor (CCP) that generally handles radio setup and channel assignments, among other call-related functions. The CCP can include the Gateway VLR. A GSMI detects the presence of a GSM call and routes the call to the GSM switch, enabling the possibility of GSM roaming. These various components can be included with or within a signaling system seven (SS-7) server unit. If present, the HLR could be part of the SS-7 server.

The Gateway Controller (GC) provides overall control of the Gateway, and that provides an interface to and controls the operation of the set of High Speed Equipment.

It should be noted that if the media or data flowing towards the user is low speed data, the signal after processing by the Operations Center is sent to the MSS system for delivery via the satellites to the UT in the normal manner of the MSS system. The decision logic or point of which path (LS or HS) to use may be located in the Operations Center, or may be located in the HS/LS Interface.

The UT can be used for the delivery of tracking and terminal control signals, as well as for low speed (MSS) data delivery and transmission. The MSS system receives supervision and control signals from the Operations Control Center or from any external facility. Alternatively, the UT and the Dual Terminal can be controlled from the HS Data System collocated with the MSS Gateway. Commands and other signals are sent via the MSS low speed data system over Control and Supervision Links. In an alternative embodiment the commands and other signals may be sent over the High Speed system. As was mentioned above, a packet data modem could also be used, as could more than one UT.

Tracking signals are important when the Dual Terminal is fitted with tracking antennas. A MSS Ground Operations Control Center (GOCC) provides information over a Ground Data Network (GDN) as to which satellite(s) of the constellation to use and for other transmission parameters, such as power at which to transmit, frequencies to use, which RF antenna(s) are to be used, etc. Antenna pointing information is sent to the Operations Center, which is preferably also connected to the GDN. The tracking and other information is sent over the Control and Supervision links to the UT and, after processing, to the baseband unit of the Dual Terminal. The baseband unit converts the information to control signals used by a Track Information unit to point and track the antenna or antennas of the Dual Terminal.

Also located in the High Speed Equipment System of the Dual Gateway is a Control and Billing Management system. The Billing and Management system is preferably connected to the GOCC via the GDN, but may instead be connected to the Gateway Management System (GMS) of the MSS Gateway. The Billing and Management system accounts for system usage and provides Call Detail Records and other information such that the user can be charged appropriately, and so that the air time used can be correctly charged to the system provider.

System control is exercised so that priorities of transmission are accounted for. For example, High Speed Data may be restricted during certain periods of time in order to allow maximum MSS voice circuit usage during high voice traffic periods. Conversely, more of the MSS bandwidth can be allocated to the High Speed Data Services during periods of lower MSS voice/data traffic demand. In this case the high speed data can be spread over a wider bandwidth, enabling higher data rates. It should be noted that in some embodiments it may not be necessary to share the in-band spectrum between the LS/HS services, as adjacent spectrum may be employed for providing the HS services (and/or for providing the LS services). Gateway provider control can be used for these purposes, or the control may be dictated by the GOCC under the direction of the system operator.

Any suitable satellite may be employed to practice the system of the instant invention. Typical satellites include LEO satellites, with or without onboard processing, MEO and GEO satellites, with or without onboard processing.

Any suitable satellite constellation may be employed to practice the system of the instant invention. Typical satellite constellations include LEO, MEO and GEO. Preferred of these is the LEO satellite which provides the requisite signal reception, reliability and clarity.

Any suitable user terminal may be employed in the system of the instant invention. Typical user terminals include mobile phones, PDAs, laptops, fixed phones, satellite data modem, car kits, airplane phones, and any devices or sensors that can be interfaced to any of the above. Preferable of these is the Globalstar® satellite phone GSP 1600, Iridium satellite phone, and the like.

Any suitable gateway may be employed in the system of the instant invention. Typical gateways include those described in assignee Globalstar's® U.S. Pat. Nos. 6,775, 251, 6,735,440, 6,661,996, 6,253,080, 6,134,423, 6,067,442, 5,918,157, 5,884,142, 5,812,538, 5,758,261, 5,634,190 and 5,592,481. A preferable one of these is the gateway as described in FIG. 2B of U.S. Pat. No. 6,804,514.

VI. BRIEF DESCRIPTION OF THE DRAWINGS

The above set forth and other features of the invention are made more apparent in the ensuing Detailed Description of the Invention when read in conjunction with the attached drawings, wherein.

VII. DETAILED DESCRIPTION OF THE INVENTION

Figure 1:
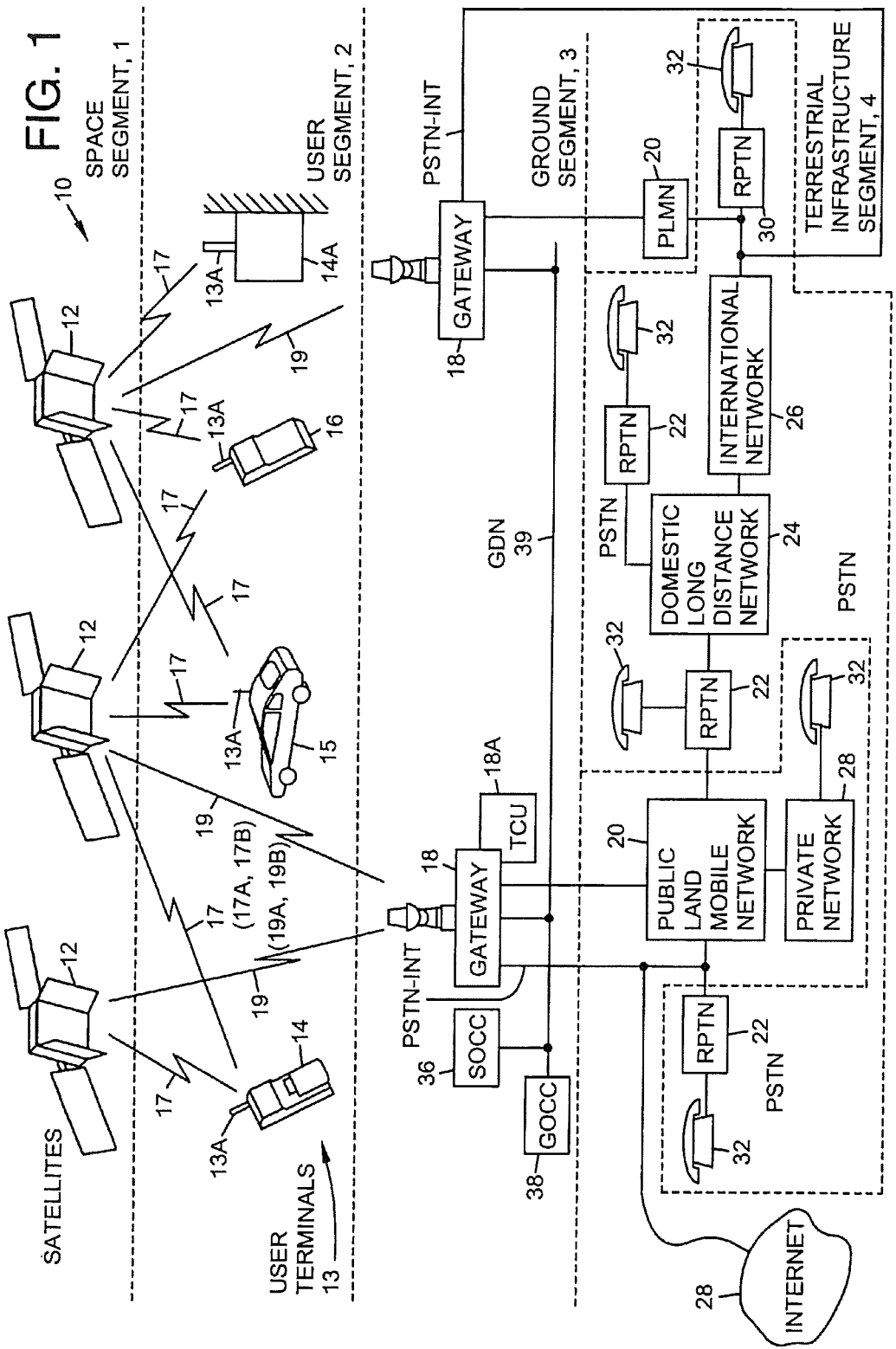
FIG. 1 is a block diagram of a satellite communication system that is constructed and operated in accordance with a presently preferred embodiment of this invention.

FIG. 1 illustrates a presently preferred embodiment of a satellite communication system 10 that is suitable for use with the presently preferred embodiment of this invention. Before describing this invention in detail, a description will first be made of the communication system 10 so that a more complete understanding may be had of the present invention.

The communication system 10 may be conceptually subdivided into a plurality of segments 1, 2, 3 and 4. Segment 1 is referred to herein as a space segment, segment 2 as a user segment, segment 3 as a ground (terrestrial) segment, and segment 4 as a terrestrial system infrastructure segment; e.g., a telephone infrastructure.

In the presently preferred embodiment of this invention there are a total of 48 satellites in, by example, a 1414 km Low Earth Orbit (LEO). The satellites 12 are distributed in eight orbital planes with six equally-spaced satellites per plane (Walker constellation). The orbital planes are inclined at 52 degrees with respect to the equator and each satellite completes an orbit once every 114 minutes. This approach provides approximately full-earth coverage with, preferably, at least two satellites in view at any given time from a particular user location between about 70 degree south latitude and about 70 degree north latitude. As such, a user is enabled to communicate to or from nearly any point on the earth's surface within a gateway (GW) 18 coverage area to or from other points on the earth's surface (by way of the PSTN), via one or more gateways 18 and one or more of the satellites 12, possibly also using a portion of the terrestrial infrastructure segment 4.

It is noted at this point that the foregoing and ensuing description of the system 10 represents but one suitable embodiment of a communication system within which the teaching of this invention may find use. That is, the specific details of the communication system are not to be read or construed in a limiting sense upon the practice of this invention.

Continuing now with a description of the system 10, a soft transfer (handoff) process between satellites 12, and also between individual ones of 16 spot beams transmitted by each satellite (FIG. 3B), provides unbroken communications via a combination of time slots and orthogonal codes.

The low earth orbits permit low-powered fixed or mobile user terminals 13 to communicate via the satellites 12, each of which functions, in a presently preferred embodiment of this invention, solely as a "bent pipe" repeater to receive a communications traffic signal (such as speech and/or data) from a user terminal 13 or from a gateway 18, convert the received communications traffic signal to another frequency band, and to then re-transmit the converted signal. That is, no on-board signal processing of a received communications traffic signal occurs, and the satellite 12 does not become aware of any intelligence that a received or transmitted communications traffic signal may be conveying.

Furthermore, there need be no direct communication link or links between the satellites 12. That is, each of the satellites 12 receives a signal only from a transmitter located in the user segment 2 or from a transmitter located in the ground segment 3, and transmits a signal only to a receiver located in the user segment 2 or to a receiver located in the ground segment 3.

The user segment 2 may include a plurality of types of user terminals 13 that are adapted for communication with the satellites 12. The user terminals 13 include, by example, a plurality of different types of fixed and mobile user terminals including, but not limited to, handheld mobile radio-telephones 14, vehicle mounted mobile radio-telephones 15, paging/messaging-type devices 16, and fixed radio-telephones 14a. The user terminals 13 are preferably provided with omnidirectional antennas 13a for bidirectional communication via one or more of the satellites 12.

It is noted that the fixed radio-telephones 14a may employ a directional antenna. This is advantageous in that it enables a reduction in interference with a consequent increase in the number of users that can be simultaneously serviced with one or more of the satellites 12.

It is further noted that the user terminals 13 may be dual use devices that include circuitry for also communicating in a conventional manner with a terrestrial cellular system.

Figure 3A:
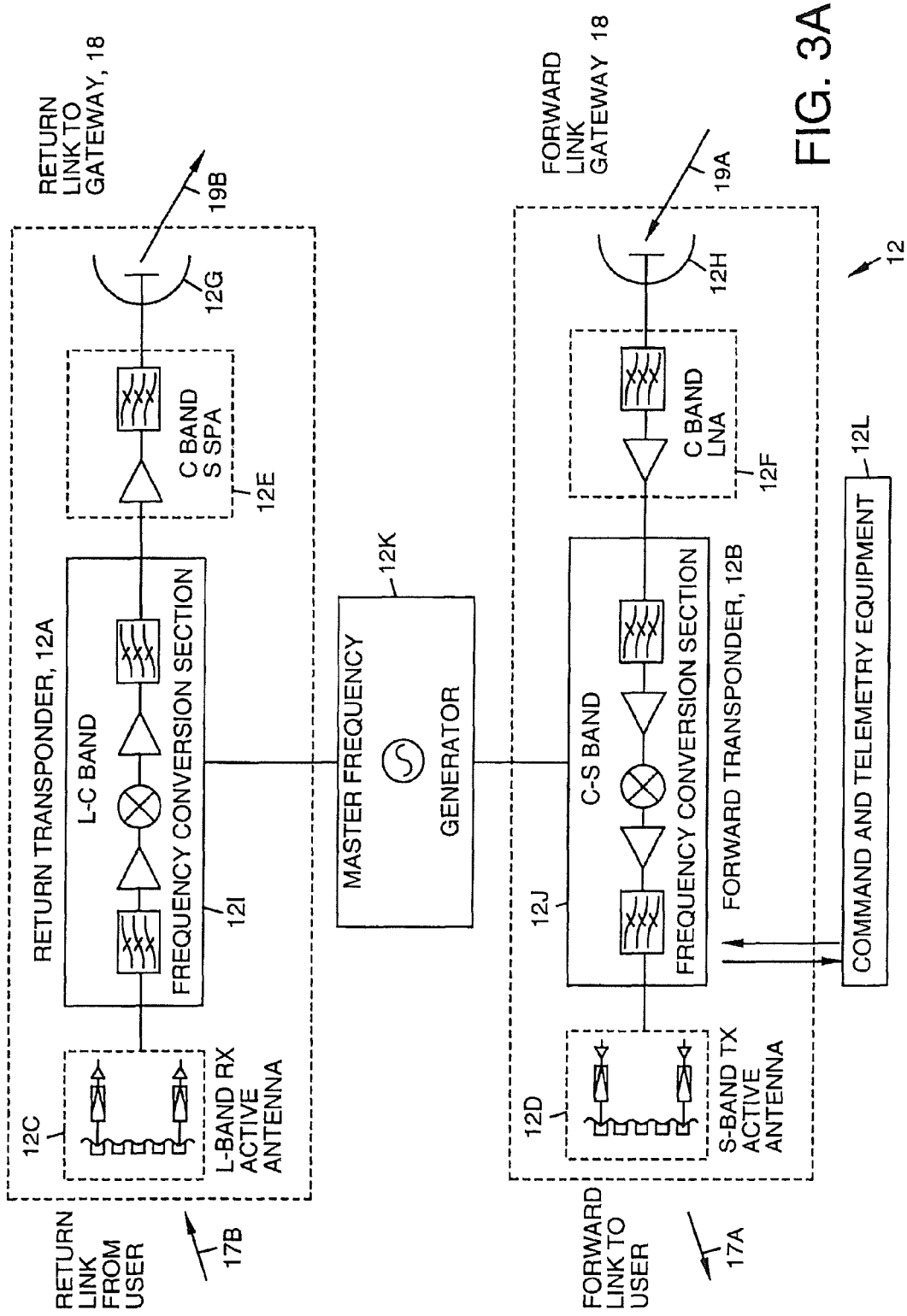
FIG. 3A is a block diagram of the communications payload of one of the satellites of FIG. 1.

Referring also to FIG. 3A, the user terminals 13 may be capable of operating in a full duplex mode and communicate via, by example, L-band RF links (uplink or return link 17b) and S-band RF links (downlink or forward link 17a) through return and forward satellite transponders 12a and 12b, respectively. The return L-band RF links 17b may operate within a frequency range of 1.61 GHz to 1.625 GHz, a bandwidth of 16.5 MHz, and are modulated with packetized digital voice signals and/or data signals in accordance with the preferred spread spectrum technique. The forward S-band RF links 17a may operate within a frequency range of 2.485 GHz to 2.5 GHz, a bandwidth of 16.5 MHz. The forward RF links 17a are also modulated at a gateway 18 with packetized digital voice signals and/or data signals in accordance with the spread spectrum technique.

The 16.5 MHz bandwidth of the forward link is partitioned into 13 channels with up to, by example, 128 users being assigned per channel. The return link may have various bandwidths, and a given user terminal 13 may or may not be assigned a different channel than the channel assigned on the forward link. However, when operating in the diversity reception mode on the return link (receiving from two or more satellites 12), the user is assigned the same forward and return link RF channel for each of the satellites.

The ground segment 3 includes at least one but generally a plurality of the gateways 18 that communicate with the satellites 12 via, by example, a full duplex C-band RF link 19 (forward link 19a to the satellite), (return link 19b from the satellite) that operates within a range of frequencies generally above 3 GHz and preferably in the C-band. The C-band RF links bidirectionally convey the communication feeder links, and also convey satellite commands to the satellites and telemetry information from the satellites. The forward feeder link 19a may operate in the band of 5 GHz to 5.25 GHz, while the return feeder link 19b may operate in the band of 6.875 GHz to 7.075 GHz.

The satellite feeder link antennas 12g and 12h are preferably wide coverage antennas that subtend a maximum earth coverage area as seen from the LEO satellite 12. In the presently preferred embodiment of the communication system 10 the angle subtended from a given LEO satellite 12 (assuming 10.degree. elevation angles from the earth's surface) is approximately 110.degree. This yields a coverage zone that is approximately 3600 miles in diameter.

Figure 3B:
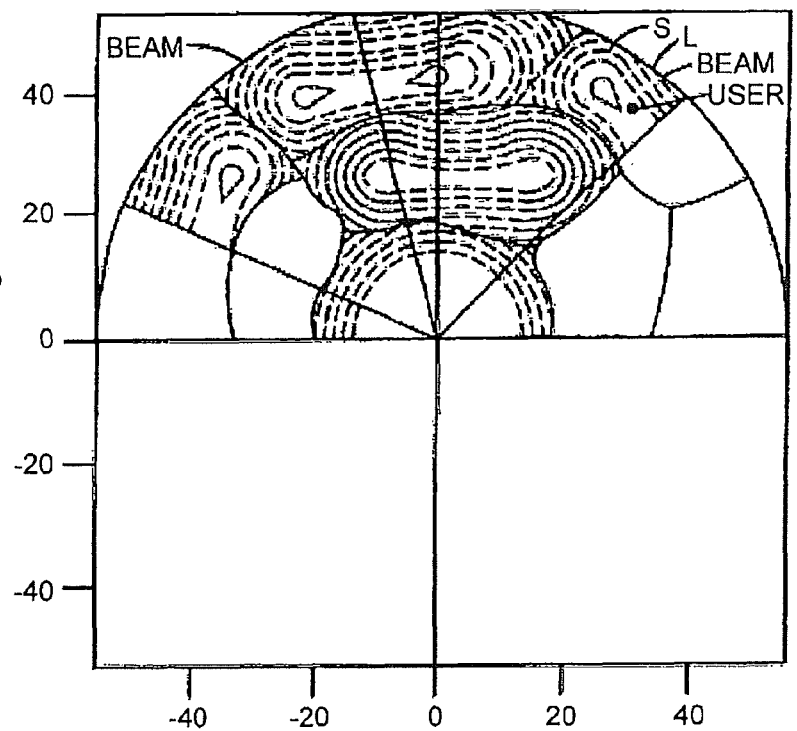
FIG. 3B illustrates a portion of a beam pattern that is associated with one of the satellites of FIG. 1.

The L-band and the S-band antennas are multiple beam antennas that provide coverage within an associated terrestrial service region. The L-band and S-band antennas 12c and 12d, respectively, are preferably congruent with one another, as depicted in FIG. 3B. That is, the transmit and receive beams from the spacecraft cover the same are on the earth's surface, although this feature is not critical to the operation of the system 10.

As an example, several thousand full duplex communications may occur through a given one of the satellites 12. In accordance with a feature of the system 10, two or more satellites 12 may each convey the same communication between a given user terminal 13 and one of the gateways 18. This mode of operation, as described in detail below, thus provides for diversity combining at the respective receivers, leading to an increased resistance to fading and facilitating the implementation of a soft handoff procedure.

It is pointed out that all of the frequencies, bandwidths and the like that are described herein are representative of but one particular system. Other frequencies and bands of frequencies may be used with no change in the principles being discussed. As but one example, the feeder links between the gateways and the satellites may use frequencies in a band other than the C-band (approximately 3 GHz to approximately 7 GHz), for example the Ku band (approximately 10 GHz to approximately 15 GHz) or the Ka band (above approximately 15 GHz).

The gateways 18 function to couple the communications payload or transponders 12a and 12b (FIG. 3A) of the satellites 12 to the terrestrial infrastructure segment 4. The transponders 12a and 12b include an L-band receive antenna 12c, S-band transmit antenna 12d, C-band power amplifier 12e, C-band low noise amplifier 12f, C-band antennas 12g and 12h, L-band to C-band frequency conversion section 12i, and C-band to S-band frequency conversion section 12j. The satellite 12 also includes a master frequency generator 12k and command and telemetry equipment 12l.

Reference in this regard may also be had to U.S. Pat. No. 5,422,647, by E. Hirshfield and C. A. Tsao, entitled "Mobile Communications Satellite "Payload", which discloses one type of communications satellite payload that is suitable for use with the teaching of this invention.

The terrestrial infrastructure segment 4 is comprised of existing communications systems and includes Public Land Mobile Network (PLMN) gateways 20, local telephone exchanges such as regional public telephone networks (RPTN) 22 or other local telephone service providers, domestic long distance networks 24, international networks 26, Internet 28 and other RPTNs 30. The communication system 10 operates to provide bidirectional voice and/or data communication between the user segment 2 and Public Switched Telephone Network (PSTN) telephones 32 and non-PSTN telephones 32 of the terrestrial infrastructure segment 4, or other user terminals of various types, which may be private networks.

Also shown in FIG. 1 (and also in FIG. 4), as a portion of the ground segment 3, is a Satellite Operations Control Center (SOCC) 36, and a Ground Operations Control Center (GOCC) 38. A communication path, which includes a Ground Data Network (GDN) 39 (see FIG. 2), is provided for interconnecting the gateways 18 and TCUs 18a, SOCC and GOCC 38 of the ground segment 3. This portion of the communication system 10 provides overall system control functions.

Figure 2:
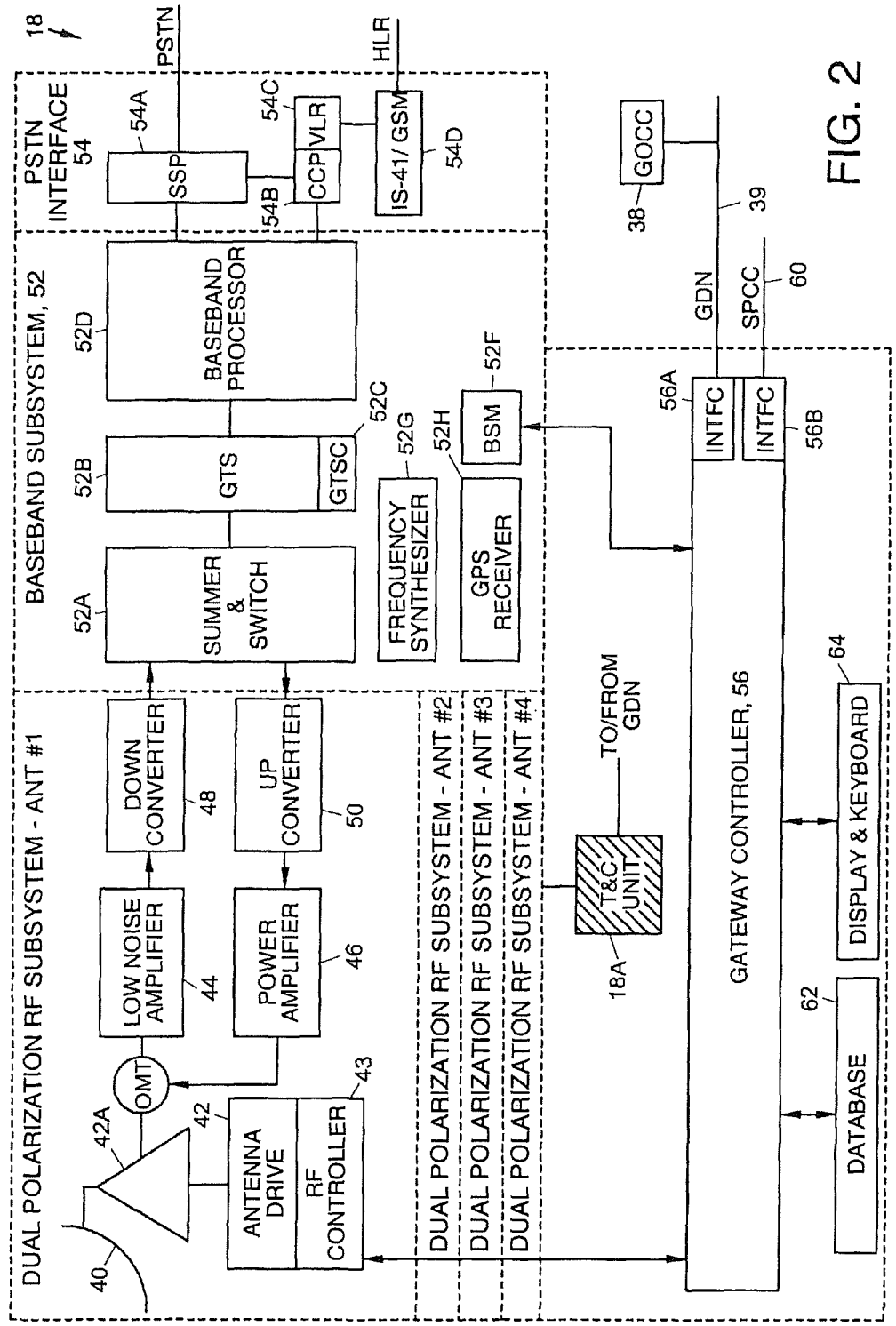
FIG. 2 is a block diagram of one of the gateways of FIG. 1.

FIG. 2 shows one of the gateways 18 in greater detail. Each gateway 18 includes up to four dual polarization RF C-band subsystems each comprising a dish antenna 40, antenna drive 42 and pedestal 42a, low noise receivers 44, and high power amplifiers 46. All of these components may be located within a radome structure to provide environmental protection.

The gateway 18 further includes down converters 48 and up converters 50 for processing the received and transmitted RF carrier signals, respectively. The down converters 48 and the up converters 50 are connected to a baseband subsystem which, in turn, is coupled to the Public Switched Telephone Network (PSTN) through a PSTN interface 54. As an option, the PSTN could be bypassed by using satellite-to-satellite links.

The baseband subsystem 52 includes a signal summer/switch unit 52a, a Gateway Transceiver Subsystem (GTS) 52b, a GTSC Controller 52c, and a Baseband Processor 52d. The baseband subsystem 52 also includes the required frequency synthesizer 52g and a Global Positioning System (GPS) receiver 52h.

The PSTN interface 54 includes a PSTN Service Switch Point (SSP) 54a, a Call Control Processor (CCP) 54b, a Visitor Location Register (VLR) 54c, and a protocol interface 54d to a Home Location Register (HLR). The HLR may be located in the cellular gateway 20 (FIG. 1) or, optionally, in the PSTN interface 54.

The gateway 18 is connected to telecommunication networks through a standard interface made through the SSP 54a. The gateway 18 provides an interface, and connects to the PSTN via Primary Rate Interface (PRI), or other suitable means. The gateway 18 is further capable of providing a direct connection to a Mobile Switching Center (MSC).

The gateway 18 provides SS-7 ISDN fixed signaling to the CCP 54b. On the gateway side of this interface, the CCP 54b interfaces with the baseband processor 52d and hence to the baseband subsystem 52. The CCP 54b provides protocol translation functions for the system Air Interface (AI).

Blocks 54c and 54d generally provide an interface between the gateway 18 and an external cellular telephone network that is compatible, for example, with the IS-41 (North American Standard, AMPS) or the GSM (European Standard, MAP) cellular systems and, in particular, to the specified methods for handling roamers, that is, users who place calls outside of their home system. The gateway 18 supports user terminal authentication for system 10/AMPS phones and for system 10/GSM phones. In service areas where there is no existing telecommunications infrastructure, an HLR can be added to the gateway 18 and interfaced with the SS-7 signaling interface.

A user making a call out of the user's normal service area (a roamer) is accommodated by the system 10 if authorized. In that a roamer may be found in any environment, a user may employ the same terminal equipment to make a call from anywhere in the world, and the necessary protocol conversions are made transparently by the gateway 18. The protocol interface 54d is bypassed when not required to convert, by example, GSM to AMPS.

It is within the scope of the teaching of this invention to provide a dedicated universal interface to the cellular gateways 20, in addition to or in place of the conventional "A" interface specified for GSM mobile switching centers and vendor-proprietary interfaces to IS-41 mobile switching centers. It is further within the scope of this invention to provide an interface directly to the PSTN, as indicated in FIG. 1 as the signal path designated PSTN-INT.

Overall gateway control is provided by the gateway controller 56 which includes an interface 56a to the above-mentioned Ground Data Network (GDN) 39 and an interface 56b to a Service Provider Control Center (SPCC) 60. The gateway controller 56 is generally interconnected to the gateway 18 through the BSM 52f and through RF controllers 43 associated with each of the antennas 40. The gateway controller 56 is further coupled to a database 62, such as a database of users, satellite ephemeris data, etc., and to an I/O unit 64 that enables service personnel to gain access to the gateway controller 56. The GDN 39 is also bidirectionally interfaced to a Telemetry and Command Unit (TCU) 18A (FIGS. 1 and 4).

Figure 4:
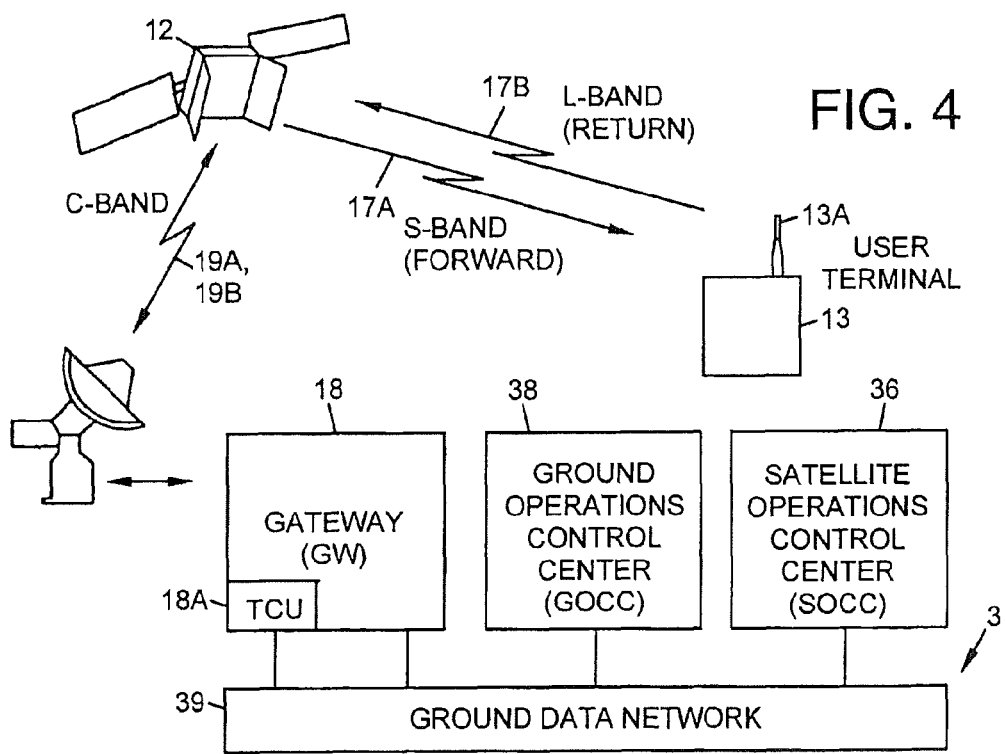
FIG. 4 is a block diagram that depicts the ground equipment support of satellite telemetry and control functions.

Referring to FIG. 4, the function of the GOCC 38 is to plan and control satellite utilization by the gateways 18, and to coordinate this utilization with the SOCC 36. In general, the GOCC 38 analyses trends, generates traffic plans, allocates satellite 12 and system resources (such as, but not limited to, power and channel allocations), monitors the performance of the overall system 10, and issues utilization instructions, via the GDN 39, to the gateways 18 in real time or in advance.

The SOCC 36 operates to maintain and monitor orbits, to relay satellite usage information to the gateway for input to the GOCC 38 via the GDN 39, to monitor the overall functioning of each satellite 12, including the state of the satellite batteries, to set the gain for the RF signal paths within the satellite 12, to ensure optimum satellite orientation with respect to the surface of the earth, in addition to other functions.

As described above, each gateway 18 functions to connect a given user to the PSTN for both signaling, voice and/or data communications and also to generate date, via database 62 (FIG. 2), for billing purposes. Selected gateways 18 include a Telemetry and Command Unit (TCU) 18a for receiving telemetry data that is transmitted by the satellites 12 over the return link 19b and for transmitting commands up to the satellites 12 via the forward link 19a. The GDN 39 operates to interconnect the gateways 18, GOCC 38 and the SOCC 36.

In general, each satellite 12 of the LEO constellation operates to relay information from the gateways 18 to the users (C band forward link 19a to S band forward link 17a), and to relay information from the users to the gateways 18 (L band return link 17b to C band return link 19b). This information includes control channels, in addition to power control signals. Satellite ephemeris update data is also communicated to each of the user terminals 13, from the gateway 18, via the satellites 12. The satellites 12 also function to relay signaling information from the user terminals 13 to the gateway 18, including access requests, power change requests, and registration requests. The satellites 12 also relay communication signals between the users and the gateways 18, and may apply security to mitigate unauthorized use.

In operation, the satellites 12 transmit spacecraft telemetry data that includes measurements of satellite operational status. The telemetry stream from the satellites, the commands from the SOCC 36, and the communications feeder links 19 all share the C band antennas 12g and 12h. For those gateways 18 that include a TCU 18a, the received satellite telemetry data may be forwarded immediately to the SOCC 36, or the telemetry data may be stored and subsequently forwarded to the SOCC 36 at a later time, typically upon SOCC request. The telemetry data, whether transmitted immediately or stored and subsequently forwarded, is sent over the GDN 39 as packet messages, each packet message containing a single minor telemetry frame. Should more than one SOCC 36 be providing satellite support, the telemetry data is routed to all of the SOCCs.

The SOCC 36 has several interface functions with the GOCC 38. One interface function is orbit position information, wherein the SOCC 36 provides orbital information to the GOCC 38 such that each gateway 18 can accurately track up to four satellites that may be in view of the gateway. This data includes data tables that are sufficient to allow the gateways 18 to develop their own satellite contact lists, using known algorithms. The SOCC 36 is not required to know the gateway tracking schedules. The TCU 18a searches the downlink telemetry band and uniquely identifies the satellite being tracked by each antenna prior to the propagation of commands.

Another interface function is satellite status information that is reported from the SOCC 36 to the GOCC 38. The satellite status information includes both satellite/transponder availability, battery status and orbital information and incorporates, in general, any satellite-related limitations that would preclude the use of all or a portion of a satellite 12 for communications purposes.

This is accomplished, generally speaking, by providing an improved system employing at least one satellite wherein each satellite provides multiple beams to a plurality of user terminals wherein at least one gateway is employed to connect to either a PSTN or the Internet, communicating with a user terminal over the satellite communication system so that the users within a given frequency range are distinguished one from the other employing a combination of time slots and orthogonal codes, i.e., a hybrid TDM/CDMA system.

Thus, for example, in a preferred embodiment a LEO satellite constellation comprising approximately 40 to 48 satellites as presently employed in the Globalstar® system is provided, employing multiple beams which may reach a plurality of user terminals. A gateway is employed connected to either a PSTN or the Internet and communicating with a user terminal over the constellation so that users within a given frequency range are distinguished one from the other employing a combination of time slots and orthogonal codes.

In a conventional embodiment of this system, the forward link from gateway through the satellite to the UT is similar to the terrestrial WCDMA forward link signal or wideband CDMA (code division multiple access) signal, except that the chip rate and the channel bandwidth are system specific. Each system is divided to frames with each frame divided into time slots. Each UT is distinguished based on a combination of time slots and orthogonal codes. Multiple codes from a single code tree, such as a set of orthogonal variable spread factor (OVSF) codes can be combined to offer different data rates as in terrestrial WCDMA. Long pseudo-random noise codes, or PN codes, are additionally used to distinguish each beam from each satellite as in the current Globalstar® system.

The power allocated to each UT based on UT type and/or UT mode of operation in each time slot is predetermined by the gateway and used to vary the data rate to the as its propagation environment changes. A similar technique is also used in HSDPA, or high speed digital packet access, in the terrestrial WCDMA standard. An alternative is to use power control similar to what is used in the current generation of Globalstar® where the UT data rate is kept constant and the power transmitted to the UT is varied according to propagation environment.

A center frequency of the signal transmitted to each UT is adjusted to precompensate for Doppler between the gateway and satellite, thus minimizing the search time and window that the UT needs to lock on to the signal. This technique is currently used in the Globalstar® system. Similarly, the timing of signals in each time slot transmitted to each UT is adjusted by the gateway based on a calculated position of each UT. This calculation may be done initially either by incorporating GPS into each UT, which informs the gateway of its coordinates, or by other known means of position location such as techniques currently used in the Globalstar® system which is based on triangulation using multiple different delays from different satellites and later on adjusting based on a rate of change of the UTs relative position to the serving Globalstar® system. The reverse link as presently employed in such a system is similar to the Globalstar® reverse link non-orthogonal, non-coherent CDMA but, in addition, it also employs time slots as in the forward link described above to allow each user to send as much or as little data as needed. Specifically, the reverse link employs short time slices of signals with different phase shifts of a long PN code to identify different users. In addition, it employs Walsh orthogonal modulation to provide high levels of immunity to noise as in the current Globalstar® system. However, the higher layers of the protocol are designed to be similar to the WCDMA higher layers so that the packet data can be officially transmitted without the need to set up dedicated channels as is done in the current Globalstar® system which employs circuit switching.

Reverse link power control can be performed as in the current Globalstar® system where data rate is fixed and power is varied as needed to meet the link budget or by varying the data rate and keeping UT power fixed as was previously mentioned for the forward link above. A trade off is employed between allowing a greater number of UT data rates to improve granularity of power utilization versus hardware complexity at the gateway.

The gateway receiver compensates for the gateway to satellite Doppler based on accurately known satellite positions and for the less precisely known UT locations.

While the present invention has been particularly described with respect to certain components in its preferred embodiment, it will be understood that the invention is not limited to these particular components described in the preferred embodiments, or the sequence in employing or methods of processing the components. On the contrary, it is intended to cover all alternatives, modifications, and equivalents as may be included within the spirit and scope of the invention defined by the appended claims.

In a first aspect of the disclosed embodiment, a satellite communication system for communicating between a plurality of user terminals is disclosed. The satellite communication system having at least one satellite which provides multiple beams, a plurality of user terminals that communicate with each other via satellites of said constellation, at least one gateway connected to a public switched telephone network and communicating with at least one user terminal over the satellite communication system wherein each of said user terminals within a given frequency band is distinguished from another of the user terminals employing a combination of time slots and orthogonal codes implemented in a forward and return link. Each of the user terminals is equipped to initiate or receive or terminate packet data messages. Each of said user terminals is handed off from one beam of a satellite to another beam of said satellite. The hand off is predicated on signal strength determined at said plurality of user terminals.

In a second aspect of the disclosed embodiment, a satellite communication system for communicating between a plurality of user terminals is disclosed. The satellite communication system having a plurality of satellites which provides multiple beams, a plurality of user terminals that communicate with each other via satellites of said constellation, at least one gateway connected to a public switched telephone network and communicating with at least one user terminal over the satellite communication system wherein each of said user terminals within a given frequency band is distinguished from another of said user terminals employing a combination of time slots and orthogonal codes implemented in a forward and return link, a ground operations control center which provides tracking information over a ground data network as to which satellites of the constellation to use and transmission parameters including transmit power, frequencies to use for communication between the plurality of user terminals, and which antenna to use. The user terminal is equipped to initiate or receive or terminate packet data messages. The user terminal uses tracking information provided by the ground operations control center to optimize its signal transmission and reception parameters.

In addition, other components may be employed in the system of the instant invention as claimed as well as variations and alternatives to the components disclosed and claimed with similar results with regard to the operation and function of the system of the instant invention. In particular, the scope of the invention is intended to include, for example, GEO satellites equipped with dynamic beam forming which further enhances the performance of the system, or equipped with a Digital Channelizer Router (DCR) or employing virtual gateway techniques as set out in U.S. Pat. No. 6,735,440, especially in FIGS. 15B-C.

What is claimed is:

1. A satellite communication system for communicating with a plurality of user terminals comprising:
   a satellite constellation comprising at least one satellite which provides multiple beams;
   a plurality of user terminals that can communicate via said satellite constellation;
   at least one gateway connected to a public switched telephone network and when communicating with at least a plurality of user terminals over the satellite communication system, distinguishing each of said user terminals within a given frequency band by employing a combination of time slots and orthogonal codes implemented in a forward and return link;
   wherein each of said user terminals is equipped to initiate or receive packet data messages;
   wherein said satellite communication system is further configured to hand off a user terminal communication from one of said user terminals, from one beam of said at least one satellite having multiple beams to another beam of said at least one satellite having multiple beams based on signal strength determined from said user terminal communicating through said at least one satellite.

2. A satellite communication system as defined in claim 1 wherein said forward link comprises orthogonal codes and said return link comprises a combination of time slots and phase shift of one or more pseudo-random codes.

3. A satellite communication system as defined in claim 1 wherein said satellite constellation comprises a LEO satellite constellation.

4. A satellite communication system as defined in claim 1 wherein said satellite constellation comprises a MEO satellite constellation.

5. A satellite communication system as defined in claim 1 wherein said satellite constellation comprises a GEO satellite constellation.

6. A satellite communication system for communicating with a plurality of user terminals comprising:
   a satellite constellation comprising a plurality of satellites which provides multiple beams;
   a plurality of user terminals that can communicate via said satellite constellation;
   at least one gateway connected to a public switched telephone network and when communicating with a plurality of user terminals over the satellite communication system, distinguishing each of said user terminals within a given frequency band by employing a combination of time slots and orthogonal codes implemented in a forward and return link;

a ground operations center configured to provide, for each user terminal communication, (i) tracking information as to which satellites of the constellation to use for said user terminal communication and (ii) transmission parameters including and satellite antenna selection to use for said user terminal communication;

wherein said user terminal is equipped to initiate or receive packet data messages; and wherein said user terminal is configured to use tracking information provided by the ground operations control center for said user terminal communication.

7. The satellite communication system of claim 6 wherein said satellite constellation comprises a LEO satellite constellation.

8. A satellite communication system as defined in claim 6 wherein said forward link comprises orthogonal codes and said return link comprises a combination of time slots and phase shift of one or more pseudo-random codes.

* * * * *